United States Patent
Sitter et al.

(10) Patent No.: US 9,995,944 B2
(45) Date of Patent: Jun. 12, 2018

(54) OPTICAL STACKS FOR SPARKLE REDUCTION

(71) Applicant: 3M INNOVATIVE PROPERTIES COMPANY, St. Paul, MN (US)

(72) Inventors: Brett J. Sitter, Cottage Grove, MN (US); Marc D. Radcliffe, Newport, MN (US); Thomas R. Hoffend, Jr., Pleasanton, CA (US); Andrew J. Ouderkirk, St. Paul, MN (US); Daniel W. Hennen, Cottage Grove, MN (US); Lan H. Liu, Rosemount, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days. days.

(21) Appl. No.: 15/315,947

(22) PCT Filed: Jun. 3, 2015

(86) PCT No.: PCT/US2015/033884
§ 371 (c)(1),
(2) Date: Dec. 2, 2016

(87) PCT Pub. No.: WO2015/191339
PCT Pub. Date: Dec. 17, 2015

(65) Prior Publication Data
US 2017/0131559 A1    May 11, 2017

Related U.S. Application Data

(60) Provisional application No. 62/011,972, filed on Jun. 13, 2014.

(51) Int. Cl.
*G02B 5/18* (2006.01)
*G02B 27/42* (2006.01)
*G02B 5/02* (2006.01)

(52) U.S. Cl.
CPC ....... *G02B 27/4216* (2013.01); *G02B 5/0242* (2013.01); *G02B 5/1814* (2013.01); *G02B 5/1823* (2013.01)

(58) Field of Classification Search
CPC ........ G02B 5/02; G02B 5/0205; G02B 5/021; G02B 5/0221; G02B 5/0226;
(Continued)

(56) References Cited

U.S. PATENT DOCUMENTS

| | | |
|---|---|---|
| 4,374,077 A | 2/1983 | Kerfeld |
| 4,576,850 A | 3/1986 | Martens |

(Continued)

FOREIGN PATENT DOCUMENTS

| | | |
|---|---|---|
| JP | 2000-155286 | 6/2000 |
| JP | 2009-286008 | 12/2009 |

(Continued)

OTHER PUBLICATIONS

Hwang, "Performance evaluation of a bigrating as a beam splitter", Applied Optics, vol. 36, No. 10, XP055216955, Apr. 1, 1997, pp. 2011-2018.

(Continued)

*Primary Examiner* — Arnel C Lavarias
(74) *Attorney, Agent, or Firm* — Clifton F. Richardson

(57) ABSTRACT

Optical stacks including a grating structure that generates diffraction in two in-plane dimensions. The optical stacks may include two gratings, which may be one-directional or two-directional, or may include a single two-directional grating. The optical stacks include particles selected to give controlled diffusion of light. The optical stacks are suitable for reducing sparkle in displays.

19 Claims, 9 Drawing Sheets

(58) Field of Classification Search
CPC .. G02B 5/0236; G02B 5/0242; G02B 5/0257;
G02B 5/0278; G02B 5/0294; G02B 5/18;
G02B 2005/1804; G02B 5/1814; G02B
5/1866; G02B 27/42; G02B 27/4233;
G02B 27/425; G02B 27/4272; G02B
27/44
USPC ....... 359/558, 566, 569, 573, 574, 575, 576,
359/599, 601, 609, 613, 614
See application file for complete search history.

(56) References Cited

U.S. PATENT DOCUMENTS

| | | | |
|---|---|---|---|
| 4,972,117 A * | 11/1990 | Adler | H01J 29/896 313/478 |
| 5,039,907 A * | 8/1991 | Adler | H01J 29/896 313/478 |
| 5,175,030 A | 12/1992 | Lu | |
| 5,183,597 A | 2/1993 | Lu | |
| 5,271,968 A | 12/1993 | Coyle | |
| 5,558,740 A | 9/1996 | Bernard | |
| 5,760,955 A | 6/1998 | Goldenberg | |
| 5,820,957 A | 10/1998 | Schroeder | |
| 5,995,690 A | 11/1999 | Kotz | |
| 7,140,812 B2 | 11/2006 | Bryan | |
| 7,291,386 B2 | 11/2007 | Richter | |
| 7,328,638 B2 | 2/2008 | Gardiner | |
| 7,350,442 B2 | 4/2008 | Ehnes | |
| 9,453,131 B2 * | 9/2016 | Geissler | B82Y 30/00 |
| 9,454,031 B2 * | 9/2016 | Gollier | G02F 1/133504 |
| 2003/0031870 A1 | 2/2003 | Argoitia | |
| 2003/0190473 A1 * | 10/2003 | Argoitia | G02B 5/1861 428/403 |
| 2009/0295024 A1 | 12/2009 | Watanabe | |
| 2012/0064296 A1 | 3/2012 | Walker, Jr. | |
| 2012/0162770 A1 * | 6/2012 | Walter | G02B 5/1809 359/566 |
| 2012/0221264 A1 | 8/2012 | Gollier | |
| 2012/0300307 A1 | 11/2012 | Borrelli | |
| 2012/0310340 A1 | 12/2012 | Knox | |
| 2013/0127689 A1 | 5/2013 | Gollier | |
| 2013/0299796 A1 | 11/2013 | Masuyama | |
| 2014/0049822 A1 | 2/2014 | Gollier et al. | |
| 2014/0178646 A1 | 6/2014 | Wolk | |
| 2014/0242343 A1 | 8/2014 | Free | |
| 2016/0016338 A1 | 1/2016 | Radcliffe | |

FOREIGN PATENT DOCUMENTS

| | | |
|---|---|---|
| KR | 2013-0112058 | 11/2013 |
| WO | WO 2000-48037 | 8/2000 |
| WO | WO 2014-014595 | 1/2014 |

OTHER PUBLICATIONS

Ro, "High-Modulus spin-on Organosilicate Glasses for Nanoporous Applications", Advanced Material, 2007, vol. 19, pp. 705-710.
Mistler, "Tape Casting Theory and Practice", 37-45 (2000).
International Search Report for PCT International Application No. PCT/US2015/033884 dated Sep. 10, 2015, 3 pages.

* cited by examiner

OPTICAL STACKS FOR SPARKLE REDUCTION

BACKGROUND

High definition displays having anti-glare coatings, other irregular coatings, scratches or marked surfaces are prone to generating sparkle which can be objectionable or distracting to the viewer. Sparkle in a display can be described as a grainy pattern that appears to move around or flicker with small changes in the position of the viewer relative to the display. There is a need for reducing sparkle in high definition displays.

SUMMARY

In some aspects, the present description relates to an optical stack including a first layer having a refractive index $n_1$ and a second layer a refractive index $n_2$ positioned adjacent to the first layer. An interface between the first layer and the second layer includes a grating which has a peak to valley height of h and the absolute value of $n_1-n_2$ multiplied by h is between about 150 nm and about 350 nm. The grating has a first pitch in the range of about 2 microns to about 50 microns. The first layer or the second layer or both the first layer and the second layer includes particles having a size, a refractive index and a number density such that when the optical stack is illuminated with a laser light having a wavelength of about 532 nm, a diffraction pattern is produced. The diffraction pattern includes a central diffraction peak having an intensity $I_0$, a nearest neighbor diffraction peak located a distance d from the central diffraction peak, and an intensity distribution. The intensity distribution includes an intensity $I_{mid}$ at a point halfway between the central diffraction peak and the nearest neighbor diffraction peak and an intensity $I_{2d}$ at a point a distance 2d from the central diffraction peak. $I_{mid}$ is greater than about 0.01 times $I_0$ and $I_{2d}$ is less than about 0.001 times $I_0$. In some cases, the grating is a one-directional grating and in some cases the grating is a two-directional grating. In some cases, $I_{mid}$ is greater than about 0.1 times $I_0$.

In another aspect, the present description relates to a display that includes an optical stack. The optical stack may be any of the optical stacks described in present description. The display includes pixels and the optical stack is positioned near the pixels such that when a first pixel having a first color is illuminated and viewed through the optical stack, secondary images are produced, each secondary image having a lateral displacement from the first pixel. The first pixel has primary neighbor pixels having the first color and secondary neighbor pixels having the first color. The lateral displacement of each secondary image is such that each secondary image overlaps with the primary neighbor pixels or overlaps with a space between the first pixel and the primary neighbor pixels, and there is substantially no overlap of the plurality of secondary images with the secondary neighbor pixels. In some cases, pixels are arranged in a pattern that repeats along a display direction and the optical stack has an orientation that includes a grating orientation direction and an angle between the display direction and the grating orientation direction is in a range of about 5 degrees to about 85 degrees.

DETAILED DESCRIPTION

Figure 1:
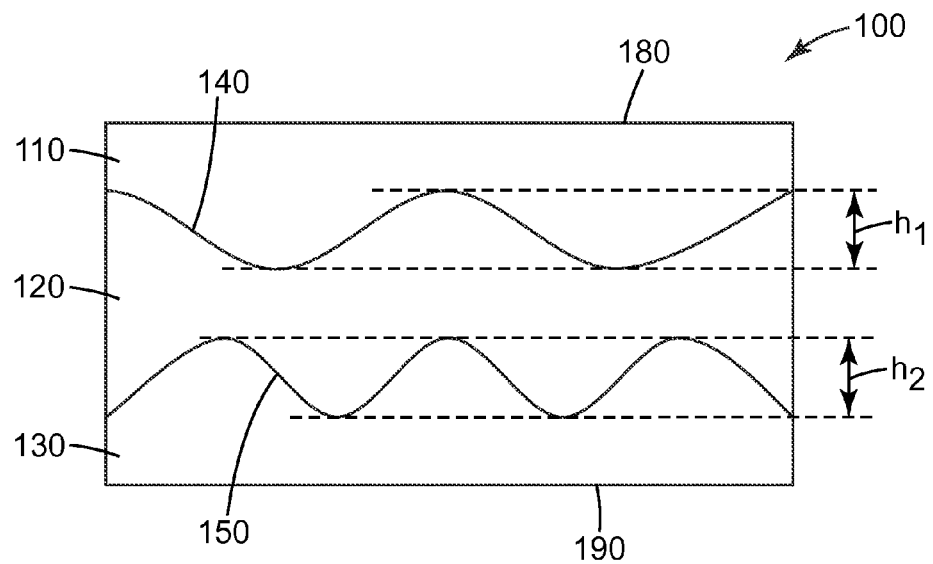
FIG. 1 is a cross-sectional view of an optical stack.

Sparkle in a display can be caused by light from a pixel interacting with a non-uniformity in the in the optical path of the light, typically on the surface of a display. Light from a pixel may appear to move around or flicker as the viewer moves due to the interaction of the pixel light with the non-uniformity. Such non-uniformities can include structure or surface texture from a film or other layer that might be added to a display. For example, surface texture in anti-glare films is often included in order to reduce specular reflection from the surface thereby reducing glare. Non-uniformities that can generate sparkle also include fingerprints, scratches or other residue on the display surface.

Approaches to reduce sparkle using one-directional periodic structures to generate diffraction are known, however it has previously been believed that using two-directional periodic structures that could produce diffraction would undesirably reduce the perceived resolution of the display. Approaches to reduce sparkle including two-directional periodic structures designed to minimize diffraction are also known, however it has been previously believed that such structures should be designed to produce insignificant diffraction effects so that the perceived resolution of the display would not be compromised. According to the present description, it has been found that a structure in a display that generates diffraction in two in-plane dimensions can be utilized without substantially reducing perceived resolution and with improved sparkle reduction compared to the one-directional case. In particular, optical stacks having two or more one-directional gratings or at least one two-directional grating selected to give controlled diffraction and optical stacks having one-directional structures that include additional elements selected to control radial diffusion of light (i.e., diffusion of light in a plane of the optical stack such that light spreads in directions other than what would be obtained with the one-directional structures alone) can be incorporated in a display to significantly reduce sparkle while substantially maintaining perceived display resolution. In either case, the structures can be described as providing a controlled level of diffraction in two in-plane dimensions.

Displays are often divided into a grid of addressable elements which may be subdivided into single color regions. As used herein, "pixel" refers to the smallest addressable element of a display. In displays in which single color elements are separately addressable, the single color elements are herein denoted "pixels" though such a separately addressable single color element may also be known as a "subpixel". A display may include a periodic arrangement of pixels of a first, second and third color. In some cases a fourth color may also be used. For example, an array of red, green and blue pixels may be used in a display. Alternatively, an array of yellow, magenta and cyan pixels may be used. Pixels of a first color are typically arranged in a periodic pattern with spaces between the pixels of the first color where pixels having other colors are located. Sparkle can be described as resulting from an apparent shift in the brightness or color of light from a pixel as an observer's position relative to the display is changed. According to the present description, an approach to reducing sparkle is to fill in the space between an illuminated pixel of a first color and its neighboring pixels of the first color with duplicate images of the illuminated pixel. In this case, an observer would notice less shift in the brightness, color or apparent location of the pixel since light from the pixel is spread over a greater area. Similarly, duplicate images of pixels of other colors can be positioned in the space between similar pixels. It is, however, generally desired to preserve the resolution of the display and spreading duplicate images of illuminated pixels over a broad area could lower the perceived resolution. It is therefore desired to control the location of the duplicate images so that sparkle is reduced while the perceived resolution of the display is maintained at an adequate level.

The present description provides for optical stacks that may be incorporated into or onto a display and that can reduce sparkle without significantly compromising perceived resolution. The optical stacks include two-directional gratings, multiple one-directional gratings and/or one-directional gratings with additional structures such as particles included to provide controlled diffusion of light. Such additional structures may also be included with two-directional gratings. In some embodiments, the optical stacks include polymeric materials and in some embodiments, the optical stacks are made from polymers and/or polymer composites and/or optically clear adhesives. In some embodiments the optical stacks are flexible films. In other embodiments, the optical stacks are made on glass or other substrates.

FIG. 1 shows a cross-section view of optical stack 100 that includes first layer 110, second layer 120, third layer 130, first grating 140 and a second grating 150. First layer 110 has a first outer major surface 180 opposite second layer 120 and third layer 130 has a second outer major surface 190 opposite second layer 120. First grating 140 has a peak to valley height of $h_1$ and second grating 150 has a peak to valley height of $h_2$. In the embodiment shown in FIG. 1, first outer major surface 180 and second outer major surface 190 are substantially planar.

The distribution of intensity of the diffraction peaks generated by diffraction gratings is a function of the product of the index contrast across the grating (i.e., the absolute value of the difference between the refractive index of the optical medium immediately on one side of the grating and the refractive index of the optical medium immediately on the other side of the grating) and the peak to valley height of the grating. As used herein, refractive index and index contrast refers to refractive index measurements using light having a wavelength of 532 nm at 25° C. and atmospheric pressure unless otherwise indicated. The index contrast times the peak to valley height can be adjusted so that diffraction peaks that reduce sparkle appear with a relative high intensity while diffraction peaks that would degrade effective resolution appear with low intensity or do not measurably appear at all. The range of useful values for the product of the index contrast and the peak to valley height may depend on the shape of the grating. The gratings may have any periodically repeating shape, for example a sinusoidal shape, a square wave shape, or the gratings may have other periodically repeating regular or irregular shapes.

First layer 110 has a refractive index $n_1$, second layer 120 has a refractive index $n_2$, and third layer 130 has a refractive index $n_3$. In some embodiments, the first layer and the third layer are made from the same or similar materials so that $n_1$ is equal to or approximately equal to $n_3$. In other embodiments $n_1$ may differ from $n_3$.

For any of the embodiments discussed herein, the index contrast for any grating multiplied by the peak to valley height of the grating may be greater than about 100 nm, or greater than about 150 nm, or greater than about 200 nm and less than about 400 nm, or less than about 350 nm, or less than about 300 nm. For example, in some embodiments, $|n_3-n_2|$ multiplied by $h_1$ is between about 100 nm and about 400 nm or between about 150 nm and about 350 nm or between about 200 nm and about 300 nm. In some embodiments, $|n_3-n_2|$ multiplied by $h_2$ is between about 100 nm and about 400 nm or between about 150 nm and about 350 nm or between about 200 nm and about 300 nm.

Optical stack 100 of FIG. 1 can be made in various ways. In some embodiments, first layer 110 and third layer 130 are made by machining a surface structure into layers of a material. For example, a layer having a surface structure can be made by using diamond tooling to cut a structure into a layer of any of a wide variety of non-polymeric materials, such as glass, or thermoplastic or crosslinked polymeric materials. Suitable materials include polyethylene terephthalate (PET), polycarbonate (PC), acrylics such as polymethyl methacrylate (PMMA), cellulose acetate, and polyolefins such as biaxially oriented polypropylene which are commonly used in various optical devices. Suitable diamond tooling is known in the art and includes the diamond tooling described in U.S. Pat. No. 7,140,812 (Bryan et al.). Alternatively, a diamond tool can be used to cut an inverted pattern into a copper micro-replication roll which can be used to make the pattern on a substrate using a continuous cast and cure process utilizing a polymerizable resin. Continuous cast and cure processes are known in the art and are described in the following patents: U.S. Pat. No. 4,374,077 (Kerfeld); U.S. Pat. No. 4,576,850 (Martens); U.S. Pat. No. 5,175,030 (Lu et al.); U.S. Pat. No. 5,271,968 (Coyle et al.); U.S. Pat. No. 5,558,740 (Bernard et al.); and U.S. Pat. No. 5,995,690 (Kotz et al.).

Other suitable processes for producing first layer 110 include laser ablation and embossing. Third layer 130 can be made using any of the techniques used to make first layer 110. In some embodiments, second layer 120 is an optically clear adhesive that is used to adhere first layer 110 and third layer 130 together. In some embodiments, first layer 110 and third layer 130 are identical or similar parts that are adhered together with second layer 120 such that the grating 140 has a first direction and the grating 150 has a second direction that is different from the first direction.

In some embodiments, second layer 120 is prepared by machining a material so that it has a first grating 140 on a first major surface and a second grating 150 on a second major surface. Such a structured layer can be prepared using any of the materials and techniques discussed elsewhere. First layer 110 may then be an optically clear adhesive or other coating that is applied to first grating 140 and third layer 130 may be an optically clear adhesive or other coating that is applied to second grating 150.

Suitable optically clear adhesives that could be used as first layer 110 and/or as third layer 130 when applied onto second layer 120 or that could be used to form second layer 120 by adhering first layer 110 to second layer 130 include Optically Clear Adhesive 817x, Optically Clear Adhesive 817x, Optically Clear Adhesive 826x, Liquid Optically Clear Adhesive 2321, CEF22xx, CEF28xx, all available from 3M Company (St. Paul, Minn.). Other suitable optically clear adhesives include UV-curable acrylates, hot-melt adhesives and solvent cast adhesives.

In some embodiments, first layer 110 includes a first polymer, second layer 120 includes a second polymer, which may the same or different from the first polymer, and third layer 130 includes a third polymer, which may be the same or different from the first or second polymers. In some embodiments, first layer 110 includes a first polymer or a first polymer composite, second layer 120 includes an optically clear adhesive, and third layer 130 includes a second polymer or a second polymer composite, which may be the same or different from the first polymer or first polymer composite. In some embodiments, first layer 110 includes a first optically clear adhesive, second layer 120 includes a first polymer or a first polymer composite, and third layer 130 includes a second optically clear adhesive, which may be the same or different from the first optically clear adhesive. Suitable polymer composites include polymers, such as polyacrylates, having inorganic nanoparticles—such as zirconia or titania nanoparticles having a mean size in the range of about 5 nm to about 50 nm—included to adjust the refractive index of the polymer composite. In some embodiments, the optical stack is a flexible film. In many embodiments, the optical stack is substantially transparent to light in the visible spectrum.

Figure 2:
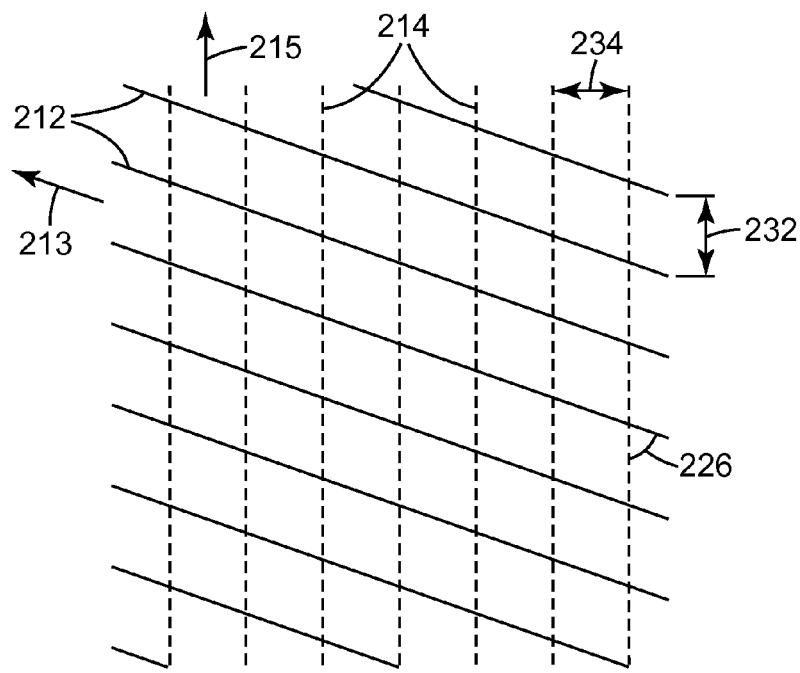
FIG. 2 is a schematic top perspective view of an optical stack.

FIG. 2 shows a schematic top view of an optical stack having a first grating represented by element 212 extending in first direction 213 and a second grating represented by element 214 extending in a second direction 215 with angle 226 between first direction 213 and second direction 215. The first grating represented by element 212 has a first pitch 232 and the second grating represented by element 214 has a second pitch 234. In many embodiments, second direction 215 is different from first direction 213. In some embodiments angle 226 is greater than 0 degrees, or greater than about 5 degrees, or greater than about 10 degrees, or greater than about 20 degrees and less than or equal to 90 degrees. It will be understood than an angle greater than 90 degrees is equivalent to a complement angle less than 90 degrees. In some embodiments, first direction 213 and second direction 215 are substantially orthogonal. In some embodiments the first pitch 232 and the second pitch 234 are about equal. In other embodiments, the first pitch 232 and the second pitch 234 are different.

The location of the diffraction peaks generated by a grating is a function of the pitch of the grating. The pitch of the gratings appearing in various embodiments of the present description can be adjusted so that diffraction peaks having a relatively high intensity will be located at regions where they are effective at reducing sparkle but not in regions where the diffraction peaks would degrade the effective image resolution of a display. The location of the diffraction peaks may depend on the spacing between pixels and on the distance between the plane of the pixels and the optical stack when it is positioned in the display. For any of the embodiments discussed herein, the pitch for any grating may be greater than about 1 micron, or greater than about 2 microns, or greater than about 4 microns or greater than about 6 microns and may be less than about 60 microns, or less than about 50 microns, or less than about 40 microns or less than about 30 microns. For example, in some embodiments first pitch 232 is between about 2 microns and about 50 microns or between about 4 microns and about 40 microns. In some embodiments, second pitch 234 is between about 2 microns and about 50 microns or between about 4 microns and about 40 microns.

Figure 3A:
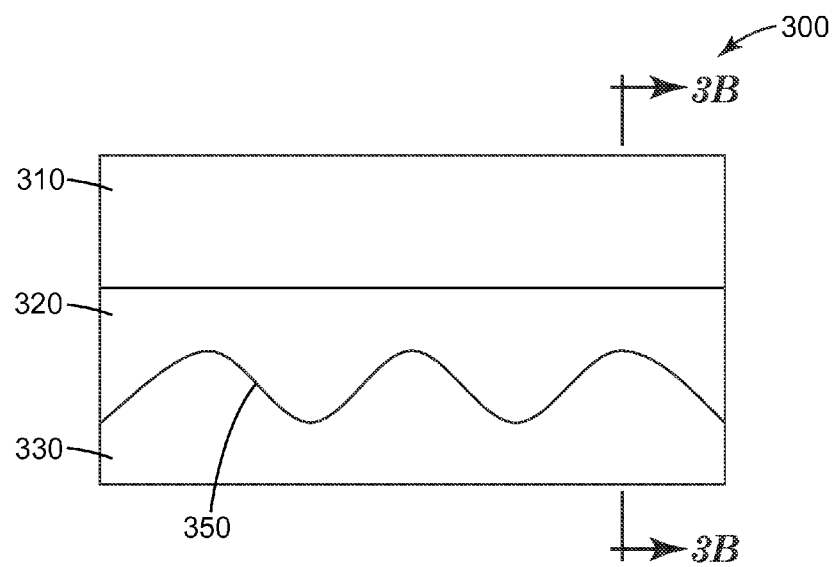
FIG. 3A is a cross-sectional view of an optical stack.
Figure 3B:
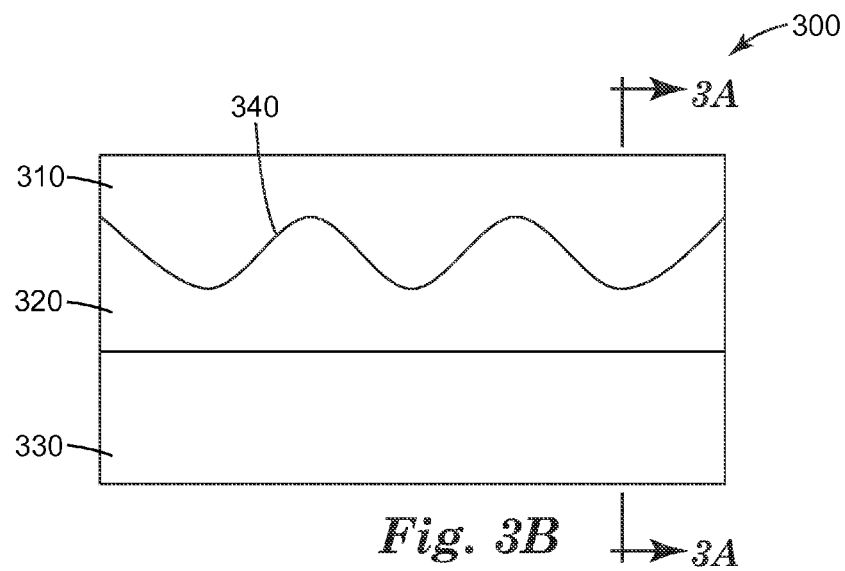
FIG. 3B is a cross-sectional view of the optical stack of FIG. 3A along a cross-section orthogonal to that shown in FIG. 3A.
Figure 3C:
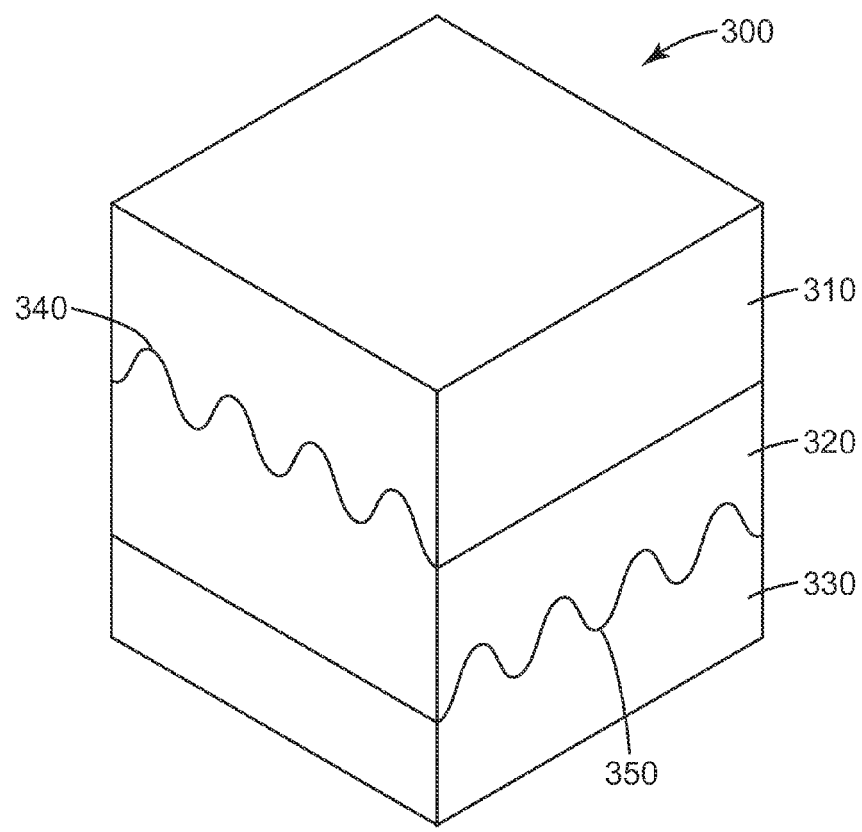
FIG. 3C is a perspective view of the optical stack of FIGS. 3A and 3B.

First direction 213 and second direction 215 may be substantially orthogonal or may be non-orthogonal. An optical stack where first direction 213 and second direction 215 are substantially orthogonal is illustrated in FIGS. 3A, 3B and 3C. Optical stack 300 has first layer 310, second layer 320, third layer 330, first grating 340 and second grating 350. First grating 340 has a first pitch substantially the same as a second pitch in second grating 350. First grating 340 extends along a first direction (into the plane of FIG. 3B) and second grating 350 extends along a second direction (into the plane of FIG. 3A) substantially orthogonal to the first direction. FIG. 3B is along the cross section indicated in FIG. 3A and FIG. 3A is along the cross section indicated in FIG. 3B. FIG. 3C is a perspective view of optical stack 300.

Figure 4:
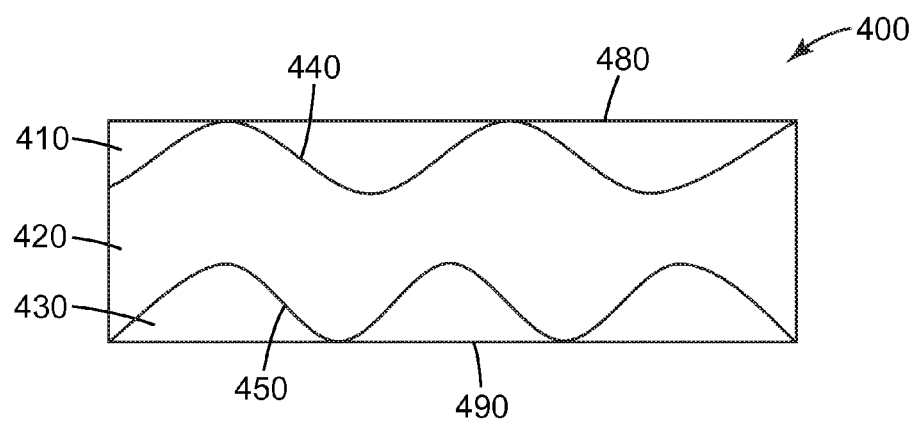
FIG. 4 is a cross-sectional view of an optical stack.

FIG. 4 shows a cross-sectional view of optical stack 400 having first layer 410, second layer 420, third layer 430, first grating 440 and a second grating 450. First layer 410 includes a first outer major surface 480 opposite second layer 420 and third layer 430 includes a second outer major surface 490 opposite second layer 420. First outer major surface 480 is substantially level with the peaks in grating 440. First outer major surface 480 can be made by forming second layer 420 using any of the methods discussed elsewhere and then applying a coating such as an optically clear adhesive to second layer 420 such that the coating fills in the grating structure and forms first outer major surface 480 which is a substantially planar surface. Similarly, second outer major surface 490 is substantially level with the peaks in grating 450 and this can be achieved by applying a coating such as an optically clear adhesive to second layer 420 opposite the first layer such that the coating fills in grating 450 and forms second outer major surface 490 which is a substantially planar surface. Suitable coatings include those discussed elsewhere.

Optical stack 400 is an alternative to the embodiment shown in FIG. 1 where first layer 110 and third layer 130 extend beyond the level of the peaks in first grating 140 and beyond the level of the peaks in the second grating 150, respectively. In another embodiment, the first layer 410 may be substantially level with the peaks in first grating 440 while third layer 430 may extend beyond the level of the peaks in second grating 450.

Figure 5A:
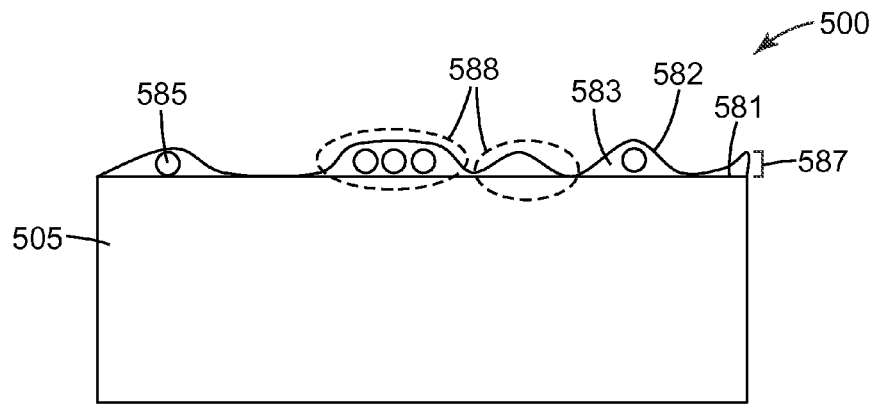
FIG. 5A is a cross-sectional view of an optical stack having an anti-glare layer.

FIG. 5A shows optical stack 500 including uncoated optical stack 505, first major surface 581, outer major surface 582, binder 583, embedded particles 585, anti-glare layer 587 and anti-glare features 588. First major surface 581 is coated with anti-glare layer 587 to produce outer major surface 582 which includes anti-glare features 588. Uncoated optical stack 505 represents any uncoated optical stack of the present description. For example, uncoated optical stack 505 may correspond with optical stack 100 of FIG. 1 in which case first major surface 581 corresponds with first outer major surface 180 of first layer 110. Anti-glare layer 587 includes a binder 583 and embedded particles 585. Anti-glare layer 587 may be any coating containing beads or other particles capable of producing an irregular surface structure for outer major surface 582. Suitable embedded particles 585 include glass beads, polymeric beads, silica particles or agglomerates of silica particles having a mean diameter in the range of about 0.1 microns to about 10 microns or in the range of about 0.3 microns to about 2 microns. Binder 583 may be selected from any optically clear adhesive or other clear materials such as transparent polymers. Suitable materials for binder 583 include the optically clear adhesives and other coatings discussed elsewhere. Other suitable materials for anti-glare layer 587 include aggregate silica particles in a cured inorganic polymer matrix as described, for example, in U.S. Pat. No. 7,291,386 (Richter et al.).

Figure 5B:
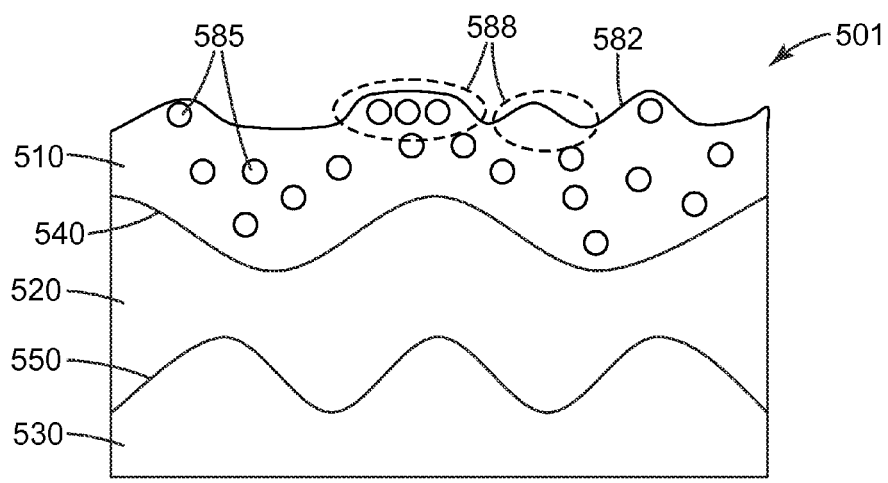
FIG. 5B is a cross-sectional view of an optical stack containing anti-glare features.

Alternatively or additionally, some embodiments include embedded particles in one of the outermost layers of the optical stack. Embedded particles may be included in any outermost layer of any optical stack of the present description. In the particular embodiment shown in FIG. 5B, optical stack 501 includes first layer 510, second layer 520, third layer 530, first grating 540 and second grating 550. Embedded particles 585 are included in first layer 510 in order to produce outer major surface 582 which includes anti-glare features 588. Any materials suitable for use as binder 583 and embedded particles 585 may also be used in first layer 510.

Figure 5C:
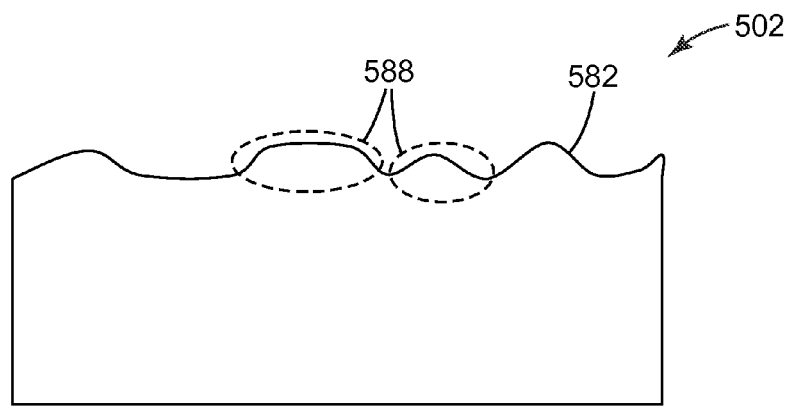
FIG. 5C is a cross-sectional view of an optical stack containing anti-glare features.

FIG. 5C shows another embodiment, where anti-glare features 588 are provided in optical stack 502 by microreplicating, roughening or texturing outer major surface 582. Optical stack 502 can represent any optical stack of the present description. For example, optical stack 502 may be obtained from optical stack 100 by structuring first outer major surface 180 to produce outer major surface 582. Methods for structuring a surface to produce anti-glare features are known in the art and are described, for example, in U.S. Pat. No. 5,820,957 (Schroeder et al.). In some embodiments, anti-glare features 588 may be obtained directly in any outer major surface of any of the optical stacks of the present description by microreplication using, for example, a cut lathe turning process as described in U.S. Pat. App. Pub. No. 2012/0064296 (Walker et al.).

Figure 5D:
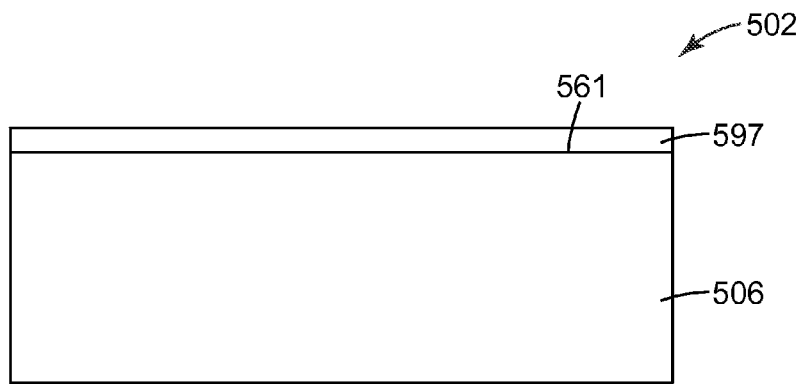
FIG. 5D is a cross-sectional view an optical stack containing an anti-glare layer.

Another approach to providing an anti-glare functionality is to add an anti-glare layer to any of the optical stacks of the present disclosure. This is illustrated in FIG. 5D where second optical stack 502 includes first optical stack 506, first major surface 561 and anti-glare layer 597 proximate first optical stack 506. First optical stack 506 represents any optical stack of the present description that does not already include anti-glare layer 597. For example, first optical stack 506 may correspond to optical stack 100 of FIG. 1 in which case first major surface 561 corresponds with first outer major surface 180 of first layer 110. In this case, anti-glare layer 597 is proximate the first layer 110. In FIG. 5D, anti-glare layer 597 is adjacent first outer major surface 561 of first optical stack 506. In alternate embodiments, one or more additional layers separate first optical stack 506 and anti-glare layer 597. Suitable layers for use as anti-glare layer 597 include Natural View Anti-Glare films available from 3M Company (St. Paul, Minn.) and include the anti-glare films described in U.S. Pat. No. 5,820,957 (Schroeder et al.) and U.S. Pat. App. Pub. No. 2012/0064296 (Walker et al.).

An alternative to using two one-directional gratings is to use a single two-directional grating. Another alternative is to use two two-directional gratings or a two-directional grating and a one-directional grating in a single optical stack. Such optical stacks can be constructed using the same techniques and materials as described for constructing optical stacks having two one-directional gratings.

Two-directional gratings may have any shape repeating in two directions. For example the gratings may have a sinusoidal shape, a square wave shape, or the gratings may have other periodically repeating regular or irregular shapes. In some embodiments, two directional gratings have a shape of the form $$z(x,y)=f(x)+g(y) \qquad \text{(Equation 1)}$$

where f(x) and g(y) are functions of x and y, respectively, where x and y are coordinates in the plane of the sample, and z(x,y) is the vertical displacement of the grating relative to a plane parallel with the plane of the optical stack. In some embodiments, the coordinate x and the coordinate y are substantially orthogonal. In other embodiments, x and y may be skew coordinates. Structures of the form of Equation 1 can be made using a tool having a shape described by the function f(x) where the tool is moved in and out of the tooled surface as the tool is moved along the y direction and the motion of the tool in and out of the tooled surface is described by the function g(y). In some embodiments, f(x) is a first periodic function having a first peak to valley height and g(y) is a second periodic function having a second peak to valley height. In some embodiments the first peak to valley height differs from the second peak to valley height. This can produce an asymmetric diffraction pattern that may be useful in some cases. In some embodiments, the index contrast of the grating multiplied by the absolute value of the difference between the first peak to valley height and the second peak to valley height is greater than 10 nm, or greater than 20 nm and less than 100 nm. In embodiments where the first peak to valley height is different from the second peak to valley height, the peak to valley height of the grating overall refers to the greater of the first and second peak to valley height.

In some embodiments, two-directional gratings having a shape of the form $$z(r)=\tfrac{1}{2}h\sin(k_1 \cdot r)\sin(k_2 \cdot r) \qquad \text{(Equation 2)}$$

are used where r is a two-dimensional position vector in the plane of the optical stack, $k_1$ and $k_2$ are non-collinear two-dimensional vectors in the plane of the optical stack, • denotes the scalar product, and h is the peak to valley height of the grating. In some embodiments, $k_1$ and $k_2$ are substantially orthogonal. In some embodiments, an angle between $k_1$ and $k_2$ is greater than 0 degrees, or greater than 5 degrees, or greater than 10 degrees and less than or equal to 90 degrees. Since the product of two sinusoids can be written as the sum of two other sinusoids, Equation 2 is a special case of Equation 1 and so the method of using a tool to produce the structure described by Equation 1 can be used to make a structure described by Equation 2.

Figure 6A:
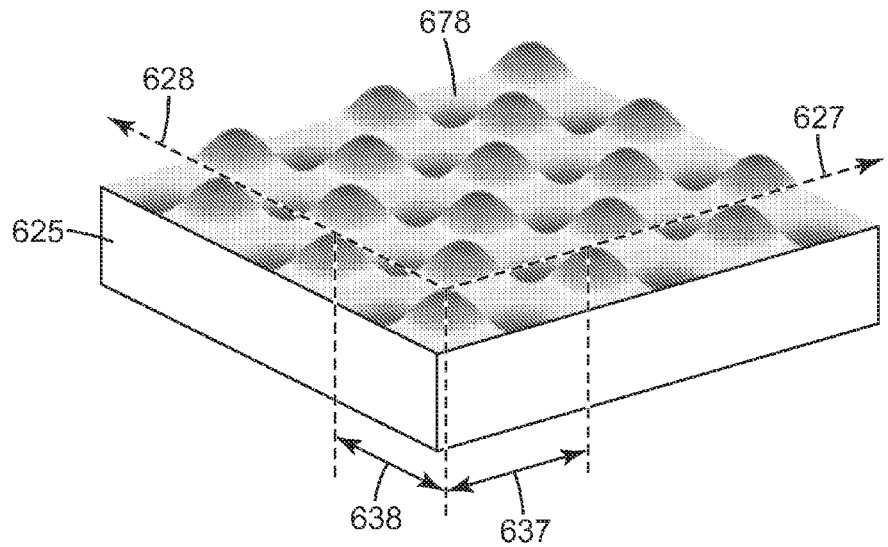
FIG. 6A is a perspective view of a first layer having a surface that includes a two-directional structure.

FIG. 6A shows first layer 625, first direction 627, second direction 628, first pitch 637 and second pitch 638. First structured surface 678 is two-directional and has first pitch 637 in first direction 627 and has second pitch 638 in second direction 628. The first structured surface 678 can be produced on a first layer 625 using any of the processes discussed for producing one-directional gratings. For example, first structured surface 678 can be produced by machining an outer surface of transparent layer 625.

Figure 6B:
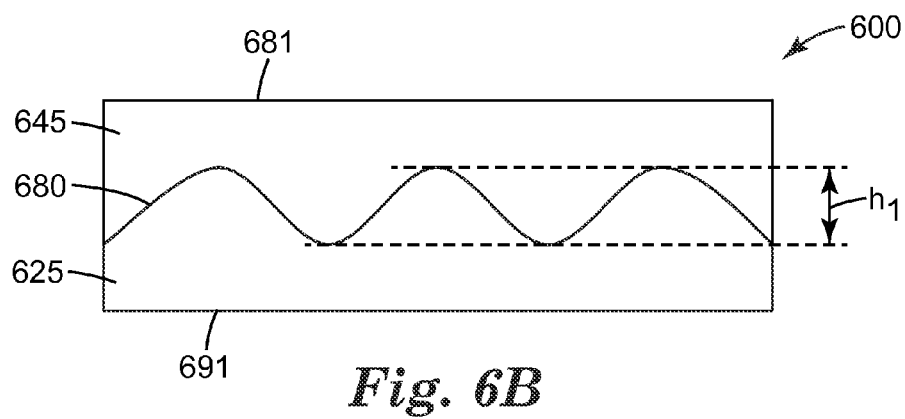
FIG. 6B is a cross-sectional view of the first layer of FIG. 6A with a second layer filling in the two-directional structure of the first layer.

FIG. 6B shows optical stack 600 which includes the first layer 625 of FIG. 6A and a second layer 645 which fills in the first structured surface 678. The interface between first layer 625 and second layer 645 includes first grating 680. Second layer 645 includes first outer major surface 681. Suitable materials for use as first layer 625 or second layer 645 include any material discussed elsewhere for use as a layer in an optical stack. In some embodiments, second layer 645 is an optically clear adhesive that is applied to first layer 625 forming a planarized layer substantially level with the peaks in first grating 680. In other embodiments, second layer 645 extends beyond the level of the peaks in first grating 680 as shown in FIG. 6B where second layer 645 includes first outer major surface 681 opposite first layer 625. In some embodiments, first outer major surface 681 is a substantially planar surface. Optical stack 600 also includes second outer major surface 691 of first transparent layer 625. In some embodiments, second outer major surface 691 is a substantially planar surface.

First grating 680 includes a first pitch equal to first pitch 637 of structured surface 678 and a second pitch equal to second pitch 638 of structured surface 678. In some embodiments, the first pitch is in a range of about 2 microns to about 50 microns or in a range of about 4 microns to about 40 microns. In some embodiments, the second pitch is in a range of about 2 microns to about 50 or in a range of about 4 microns to about 40 microns.

First layer 625 has a refractive index $n_1$ and second layer 645 has a refractive index $n_2$. First grating 680 has a peak to valley height $h_1$. The index contrast of first grating 680 multiplied by the peak to valley height $h_1$ may be in the ranges described for the gratings of FIG. 1. For example, in some embodiments, $|n_1-n_2|$ multiplied by $h_1$ is between about 100 nm and about 400 nm or between about 150 nm and about 350 nm or between about 200 nm and about 300 nm.

Figure 6C:
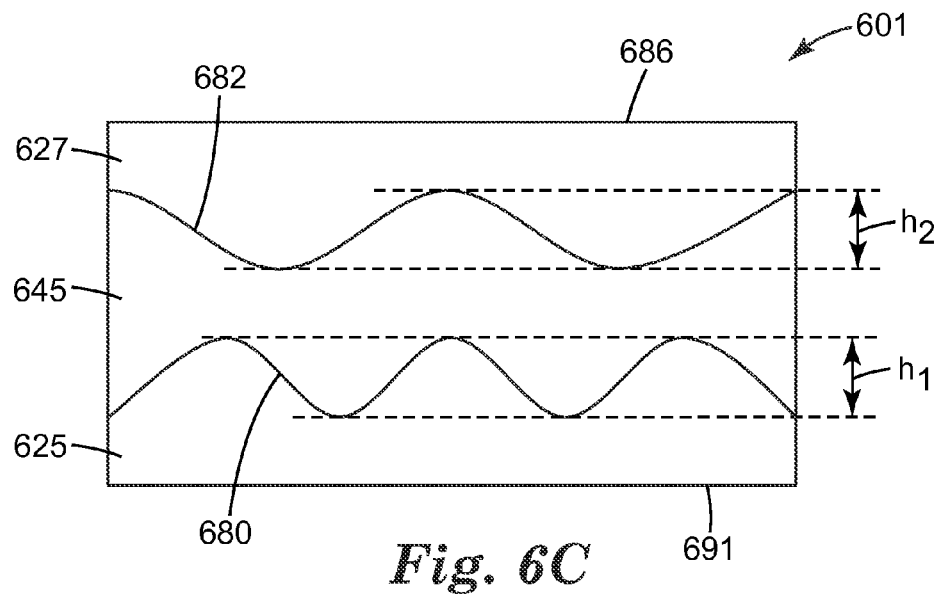
FIG. 6C is a cross-sectional view of an optical stack.

Another embodiment is shown in FIG. 6C which shows optical stack 601 with third layer 627 added to the optical stack shown in FIG. 6B. Optical stack 601 includes second grating 682 and first outer major surface 686. Third layer 627 is disposed adjacent the second layer 645 opposite the first layer 625. The interface between the second layer and the third layer includes second grating 682. Second grating 682 may be the same or different from first grating 680. Second grating 682 may be two-directional or it may be one-directional. Suitable materials for use in third layer 627 include any material discussed elsewhere for use as a layer in an optical stack. Third layer 627 has a refractive index $n_3$ and second grating 682 has a peak to valley height $h_2$. The index contrast of second grating 682 multiplied by the peak to valley height $h_2$ may be in the ranges described for the gratings of FIG. 1. In some embodiments, second transparent layer 627 includes at least one pitch in a range of about 2 microns to about 50 or in a range of about 4 microns to about 40 microns.

In some embodiments, first layer 625 includes a first polymer or a first polymer composite and second layer 645 includes an optically clear adhesive. In some embodiments, third layer 627 is included in the optical stack and in some embodiments third layer 627 includes a second polymer or a second polymer composite which may be same or different from the first polymer or first polymer composite. In some embodiments, first layer 625 includes a first polymer, second layer 645 includes a second polymer which may be the same or different than the first polymer, and third layer 627 includes a third polymer which may be the same or different from the first and second polymers. In some embodiments, first layer 625 includes a first optically clear adhesive, second layer 645 includes a polymer or a polymer composite, and third layer 627 includes a second optically clear adhesive which may be the same or different from the first optically clear adhesive. In some embodiments, the optical stack 600 or the optical stack 601 is a flexible film.

In some embodiments, optical stack 600 or optical stack 601 may include an anti-glare layer. An anti-glare layer may be disposed proximate second layer 645 or proximate first layer 625 in optical stack 600 or may be disposed proximate third layer 627 or proximate first layer 625 in optical stack 601. In some embodiments, first outer major surface 681 of optical stack 600 or second outer major surface 691 may include anti-glare features which may include embedded particles. Any of the anti-glare features preciously discussed in connection with FIGS. 5A through 5D can be applied to the embodiments shown in FIGS. 6B and 6C. For example, referring to FIG. 6B, first outer major surface 681 or second outer major surface 691 can be coated with an anti-glare layer, such as a binder containing particles; or particles can be included in second layer 645 or first layer 625 in order to produce anti-glare features in first outer major surface 681 or second outer major surface 691; or first outer major surface 681 or second outer major surface 691 can be microreplicated, roughened or texturized to produce anti-glare features. Similarly for optical stack 601 in FIG. 6C, first outer major surface 686 or second outer major surface 691 can be coated with an anti-glare layer, such as a binder containing particles; or particles can be included in third layer 627 or first layer 625 in order to produce anti-glare features in first outer major surface 686 or second outer major surface 691; or first outer major surface 686 or second outer major surface 691 can be microreplicated, roughened or texturized to produce anti-glare features.

One-directional or two-directional gratings can be obtained by any of the processes discussed elsewhere. An alternative technique for obtaining one-directional or two-directional gratings is to use structured transfer tape as described in U.S. patent application Ser. No. 13/723,716, filed Dec. 21, 2012 (Wolk et al.). In this technique, a structured template layer is disposed on a carrier. The resulting structure is then coated with an uncured backfill layer so that the uncured backfill layer completely contacts the structured template layer. The backfill may then be dried, thermally crosslinked, or photocrosslinked to produce a stable intermediate film. The structure is then inverted and laminated to a receptor substrate that in some cases is coated with an adhesion promotion layer. The structured template layer may then be removed leaving the structured backfill layer attached to the receptor substrate. In some embodiments, backfills are tacky at room temperature before photocuring in which case an adhesion promotion layer may not be needed. For example, polyvinyl silsesquioxane can be used as a backfill layer without an adhesion promotion layer.

The structured backfill layer may then be filled with an optically clear adhesive or other coating to form an optical stack of the present description. For example, optical stack 600 of FIG. 6B can be made using this technique with first layer 625 formed from the backfill material and second layer 645 provided by an optically clear adhesive or other coating. Alternatively the structured lamination transfer film method can be used to apply a structure to both sides of a receptor substrate and then the structures on both sides of the substrate can be filled in with an optically clear adhesive or other coating to form an optical stack of the present description. For example, optical stack 601 of FIG. 6C can be made using this technique where the receptor substrate with backfill layers on both sides form second layer 645 and the optically clear adhesives or other coatings form first layer 625 and third layer 627.

In the transfer tape approach, the template layer imparts a structure to the backfill layer. The structured template layer can be formed through embossing, replication processes, extrusion, casting, or surface structuring, or other structuring methods discussed elsewhere.

Typically, the backfill layer is made from a polymerizable composition comprising monomers which are cured using actinic radiation, for example, visible light, ultraviolet radiation, electron beam radiation, heat and combinations thereof. Any of a variety of polymerization techniques, such as anionic, cationic, free radical, condensation or others may be used, and these reactions may be catalyzed using photo, photochemical or thermal initiation. Reinforced silicone polymers can be used for the backfill layer, due to their high chemical stability and excellent adhesion to glass. In this case, an adhesion promotion layer may not be needed for adhesion to glass substrates. Materials that may be used for the backfill include polysiloxane resins, polysilazanes, polyimides, silsesquioxanes of bridge or ladder-type, silicones, silicone hybrid materials, vinyl silsequioxanes; sol gel materials; nanoparticle composites and many others.

Different varieties of the above materials can be synthesized with higher refractive index by incorporating nanoparticles or metal oxide precursors in with the polymer resin. Silecs SC850 (Silecs International Pte. Ltd., Singapore) modified silsesquioxane (n≈1.85) and Brewer Science (Rolla, Mo.) high index polyimide OptiNDEX D1 material (n≈1.8) are examples in this category. Other materials include a copolymer of methyltrimethoxysilane (MTMS) and bistriethoxysilylethane (BTSE) (Ro et. al, *Adv. Mater.* 2007, 19, 705-710). This synthesis forms readily soluble polymers with very small, bridged cyclic cages of silsesquioxane. This flexible structure leads to increased packing density and mechanical strength of the coating. The ratio of these copolymers can be tuned for very low coefficient of thermal expansion, low porosity and high modulus.

Another technique of obtaining gratings is to use structured lamination transfer film as described in PCT Publication No. WO 2014/014595 (Wolk et al.). In this technique, a lamination transfer film is prepared that includes a liner (carrier substrate) having a releasable surface and a sacrificial layer on the releasable surface. The film is structured using any thermoplastic replication technique (e.g., hot embossing) to produce a structured surface on the sacrificial layer. The structured sacrificial layer is then coated with and in many cases substantially planarized with a backfill layer. The film is laminated to a receptor substrate and the liner is removed. An optional adhesion promoting layer can be applied to backfill layer or to receptor substrate. The structured sacrificial layer is then cleanly baked out or otherwise removed, leaving a structured surface substantially intact on the backfill layer.

The structured backfill layer may then be filled with an optically clear adhesive or other coating to form an optical stack of the present description as described elsewhere. Alternatively the structured lamination transfer film method can be used to apply a structure to both sides of a receptor substrate and then the structures on both sides of the layers filled in with an optically clear adhesive or other coating to form an optical stack of the present description as described elsewhere.

Materials discussed in connection with the backfill layer in the structured transfer tape approach may also be used as backfill materials in the structured lamination transfer film approach. Materials that may be used for the sacrificial layer include, polyvinyl alcohol (PVA), ethylcellulose, methylcellulose, polynorbornes, poly(methylmethacrylate (PMMA), poly(vinylbutyral), poly(cyclohexene carbonate), poly(cyclohexene propylene) carbonate, poly(ethylene carbonate) poly(propylene carbonate) and other aliphatic polycarbonates, and other materials described in chapter 2, section 2.4 "Binders" of R. E. Mistler, E. R. Twiname, Tape Casting: Theory and Practice, American Ceramic Society, 2000. There are many commercial sources for these materials. These materials are typically easy to remove via dissolution or thermal decomposition via pyrolysis or combustion.

An alternative structured lamination transfer film technique that may be used for making the optical stacks of the present description is to use the lamination transfer film with embedded structures technique of U.S. patent application Ser. No. 13/778,276, filed Feb. 27, 2013 (Free et al.). In this technique, a lamination transfer film is prepared that includes a liner (carrier substrate) having a releasable surface and a sacrificial template layer on the releasable surface. The sacrificial template layer includes sacrificial material and inorganic nanomaterials. The lamination transfer film is structured using any thermoplastic replication technique (e.g., hot embossing) to produce a structured surface on the sacrificial template layer. The structured sacrificial template layer is then coated with and in many cases substantially planarized with a backfill layer. The film is laminated to a receptor substrate and the liner is removed. An optional adhesion promoting layer can be applied to backfill layer or to receptor substrate. The sacrificial material of the sacrificial template layer is then baked out leaving a densified layer of nanomaterials on the structured surface of the backfill layer.

"Densified layer of nanomaterials" refers to a layer with an increased volume fraction of nanomaterials resulting from the pyrolysis or combustion of a layer containing a polymer or other organic constituents and inorganic nanomaterials. The densified layer may include nanomaterials, partially-fused nanomaterials, chemically sintered nanomaterials, a fused glass-like material resulting from a sintering process, or a frit. It may further include residual non-particulate organic or inorganic material that acts as a sintering agent or binder.

The sacrificial materials and backfill materials described elsewhere can be used with the lamination transfer film with embedded structures technique. Suitable inorganic nanomaterials include may include inorganic nanoparticles such as nanoparticles of a metal oxide. Nanoparticles can have a particle size from approximately 5 to 75 nm. Zirconia, silica, titania, antimony oxides, alumina, tin oxides, and/or mixed metal oxide nanoparticles can be present in the lamination transfer film in an amount from 10 wt % to 70 wt %

Figure 7:
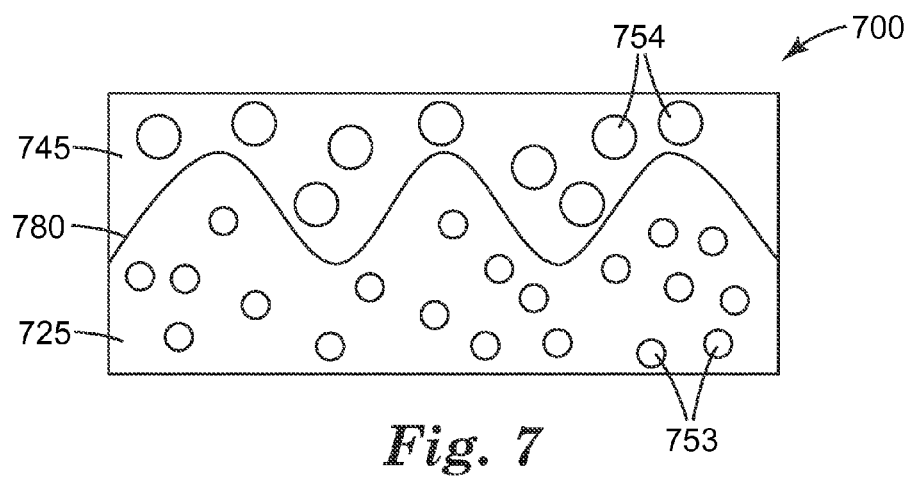
FIG. 7 is a cross-sectional view of an optical stack including particles.

In some embodiments of the optical stacks of the present description, a plurality of particles or beads providing a controlled diffusion of light may be added to one or more of the layers. Such beads can cause a pixel image to spread over an area larger than the pixel size when viewed through the optical stack and this can help reduce sparkle. In some cases, particles are added to the first layer, the second layer, and/or the third layer of the embodiments shown in FIGS. 1 through 5C. In some cases, particles are added to first layer 625 and/or second layer 645 of the embodiment shown in FIG. 6B. In some cases, particles are added to first layer 625 and/or second layer 645 and/or third layer 627 of the embodiment shown in FIG. 6C. FIG. 7 shows optical stack 700 which includes first layer 725, second layer 745, first particles 753 incorporated into first layer 725, second particles 754 incorporated into second layer 745, and grating 780. First particles 753 may have a size distribution or a refractive index or a number density that differs from those of second particles 754. Grating 780 may be one-directional or two-directional.

In addition to reducing sparkle, incorporating a plurality of particles or beads can reduce iridescence that may occur. When an optical stack having a grating is included in a display, iridescence due to the frequency dependence of reflection of ambient light from the optical stack can sometimes be observed. An anti-glare layer can significantly reduce such iridescence, but the iridescence may be objectionable in displays not incorporating an anti-glare layer. Incorporating particles into the optical stack allows the iridescence to be reduced or substantially eliminated. Particles may be incorporated into any of the layers of any of the optical stacks described herein. The particles may be incorporated into a layer immediately adjacent a grating or the particles may be incorporated into a separate additional layer disposed proximate the grating layers. The separate additional layer may be a film with a substantially unstructured surface.

It has been found that particle sizes (i.e., mean diameters) in the range of about 0.5 microns to about 30 microns can be effective in producing the desired degree of spreading the pixel image. In some embodiments, the mean diameter of the particles is greater than about 0.5 microns, or greater than about 1 micron or greater than about 2 microns and the mean diameter of the particles is less than about 30 microns, or less than about 20 microns or less than about 10 microns.

In some embodiments, a display includes an optical stack as described elsewhere with particles in one or more of the layers of the optical stack, where the display includes a plurality of pixels and the optical stack is positioned proximate the plurality of pixels such that the grating is at a distance Z from a plane containing the plurality of pixels. The plurality of pixels have a pitch P in a first direction. The plurality of particles may be substantially monodispersed and have an average diameter D in a range of about 0.7 to about 2.5 times Z divided by P in microns. It has been found that particles having a size in this range can be effective in producing the desired degree of spreading the pixel image.

The absolute value of the refractive index difference between the particles and the medium in which they are located is herein denoted $|\Delta n|$. It has been found that $|\Delta n|$ in the range of about 0.001 to about 0.1 can be effective in producing the desired degree of spreading the pixel image. In some embodiments, $|\Delta n|$ is greater than about 0.001 or greater than about 0.003 and less than about 0.1 or less than about 0.05 or less than about 0.01. In some embodiments, $|\Delta n|$ is in a range of about 0.003 to about 0.007. For example, PMMA beads in CEF22 optically clear adhesive (available from 3M Company, St. Paul) gives a $|\Delta n|$ of about 0.005 at 532 nm (and about 0.004 at 405 nm and about 0.003 at 632 nm).

The particles can be any particles having a size and refractive index in the desired range. The particles can have a spherical, ellipsoidal, irregular or other shape. Glass beads or polymeric beads may be used.

In some embodiments, the particles are substantially monodispersed. Substantially monodispersed particles may have a distribution of particle diameters such that 90 percent or more or 95 percent or more of the particles have a diameter within 5 percent or within 10 percent of the mean particle diameter. Substantially monodispersed particles may have a distribution of particle diameters having a coefficient of variation (standard deviation divided by mean times 100 percent) of less than about 10 percent, less than about 5 percent, or less than about 4 percent. Suitable substantially monodispersed particles include monodisperse PMMA microspheres e from Microbeads AS (Skedsmokorset, Norway) or monodisperse PMMA microspheres from EPRUI Nanoparticles & Microspheres Co. Ltd. (Nanjing China) having a coefficient of variation below about 3.5 percent.

It has been found that using particles at a number density between about $10^4$ mm$^{-3}$ and about $10^8$ mm$^{-3}$ can be effective in producing the desired degree of spreading the pixel image. Typically a lower number density is useful when a large particle size is used and a larger number density is useful when a smaller particle size is used. In some embodiments, the number density is greater than $10^4$ mm$^{-3}$ or $10^5$ mm$^{-3}$ and less than $10^8$ mm$^3$ or $10^7$ mm$^{-3}$.

Figure 8:
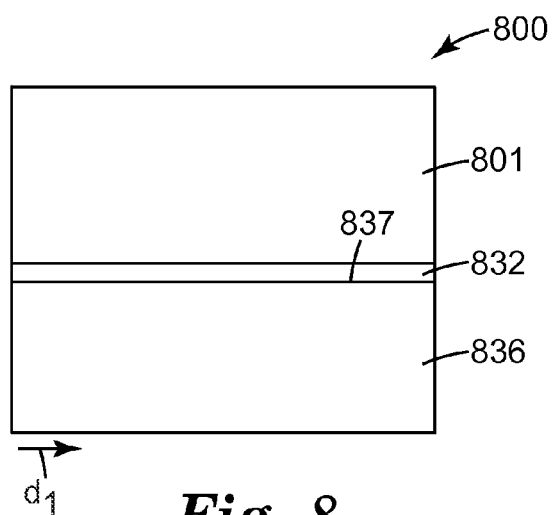
FIG. 8 is a schematic cross-sectional view of a display incorporating an optical stack.

The optical stack of any of the embodiments of the present description may be incorporated into a display, for example, by adhering the optical stack to the outer surface of a display using an optically clear adhesive. This is illustrated in FIG. 8 which schematically shows a display 800 including an optical stack 801, optically clear adhesive layer 832, and a display unit 836 having outer surface 837. Optical stack 801, which may be any optical stack of the present description, is attached to display unit 836 through optically clear adhesive layer 832. In some embodiments, an outer layer of optical stack 801 is formed with an optically clear adhesive and a separate optically clear adhesive layer, such as optically clear adhesive layer 832, is not needed. In alternative embodiments, the optical stack may be positioned between a display panel and an outer glass layer of the display. The display 800 has a display direction $d_1$ which is along the length or the width of the display. Optical stack 801 has an orientation that includes at least one grating orientation direction. For example, referring to FIG. 2, first direction 213, which is a direction along which a first grating represented by element 212 extends, defines a grating orientation direction. Similarly, referring to FIG. 6, first direction 627, which is a direction along which structured surface 678 repeats with first pitch 637, defines a grating orientation direction. An angle between the display direction and the grating orientation direction can be any value. However, positioning the optical stack such that this angle is greater than 0 degrees and less than 90 degrees may be useful for reducing Moiré. In some embodiments, an angle between the display direction and the grating orientation direction is in a range of about 5 degrees to about 85 degrees or about 10 degrees to about 80 degrees or about 20 degrees to about 70 degrees.

Figure 9:
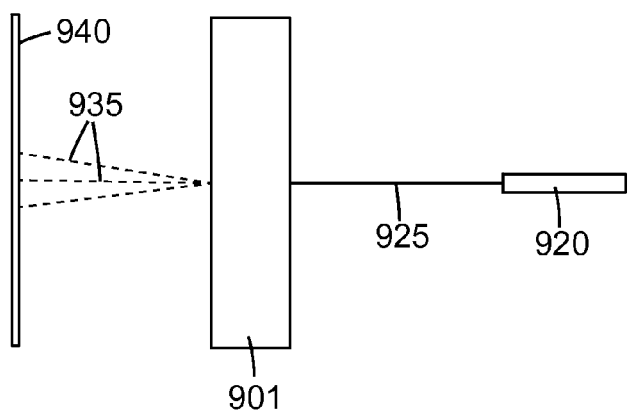
FIG. 9 is a drawing illustrating illuminating an optical stack.
Figure 10:
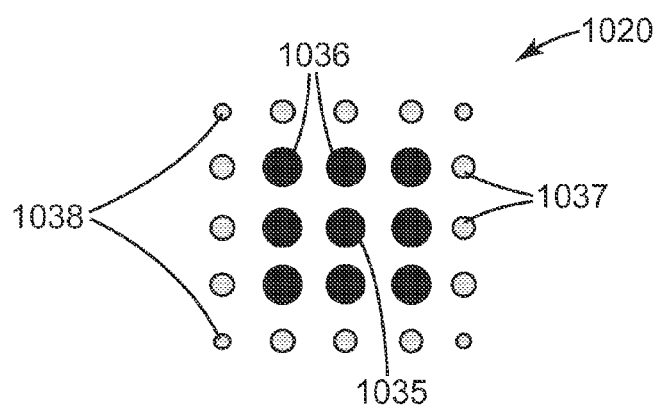
FIG. 10 shows a diffraction pattern generated by illuminating an optical stack.

The optical stacks described herein are capable of producing diffraction when a light source is viewed through the optical stack. FIG. 9 illustrates a technique for measuring diffraction produced by optical stack 901. A light source 920 produces a light beam 925 which is directed through optical stack 901 producing diffracted light 935 which projects onto screen 940. The orientation of optical stack 901 may be chosen such that an outer major surface that would face a light source when optical stack 901 is used in a display faces light source 920. In some embodiments, the optical stack produces a diffraction pattern 1020 as illustrated in FIG. 10. Diffraction pattern 1020 includes central diffraction peak 1035, a set of 9 diffraction peaks 1036 that contain most of the energy of the diffracted light, and higher order diffraction peaks 1037 and 1038.

Light beam 925 has an incident power $P_I$. In some cases, light beam 925 is a beam of laser light having a wavelength of about 532 nm. Lasers producing light having this wavelength include diode pumped solid state frequency-doubled (DPSSFD) lasers commonly used in green laser pointers. In other cases, light source 925 is a pixel in a display. The pixel may be a green pixel and may produce light having a wavelength in the range of about 520 nm-570 nm. Each of the diffraction peaks has an optical power content and a diffraction order. The sum of each power content of the diffraction peaks in the set of 9 diffraction peaks 1036 is herein denoted $P_9$. In some embodiments, $P_9$ is at least about 0.6 $P_I$, or at least about 0.7 $P_I$, or at least about 0.8 $P_I$, or at least about 0.9 $P_I$ or even at least about 0.95 $P_I$. In some embodiments, each power content of the diffraction peaks in the set of 9 diffraction peaks 1020 is greater than about 0.06 $P_9$, or greater than about 0.07 $P_9$, or greater than about 0.08 $P_9$, or greater than about 0.09 $P_9$, or greater than about 0.1 $P_9$ and less than about 0.18 $P_9$, or less than about 0.17 $P_9$, or less than about 0.16 $P_9$, or less than about 0.15 $P_9$, or less than about 0.14 $P_9$, or less than about 0.13 $P_9$, or less than about 0.12 $P_9$. In some embodiments, the power content of the each of the diffraction peaks in the set of 9 diffraction peaks is substantially equal to one ninth of $P_9$.

In some embodiments, the diffraction order of each peak in the set of 9 diffraction peaks is lower than the diffraction order of each diffraction peak not in the set of 9 diffraction peaks. For embodiments having a two-directional grating or two one-directional gratings, the diffraction order can be represented by a pair of integers $(q_1, q_2)$. A diffraction order $(q_1, q_2)$ is lower than a diffraction order $(p_1, p_2)$ if $q_1^2+q_2^2$ is less than $p_1^2+p_2^2$. In the embodiment shown in FIG. 10, the central diffraction peak 1035 has a diffraction order of (0,0) while the remaining 8 diffraction peaks in the set of 9 diffraction peaks 1036 have diffraction order $(\pm 1,0)$, $(0,\pm 1)$ or $(\pm 1,\pm 1)$. Diffraction peaks 1037 having higher diffraction order and diffraction peaks 1038 having still higher diffraction orders are also shown in FIG. 10. Diffraction peaks 1037 and diffraction peaks 1038 have lower power content than the diffraction peaks in the set of 9 diffraction peaks 1036.

Figure 11:
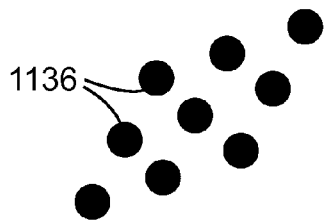
FIG. 11 shows a diffraction pattern generated by illuminating an optical stack.

In the embodiment shown in FIG. 10, the diffraction pattern forms a square array of diffraction peaks. This will typically occur when the optical stack has a two-directional grating having a pitch in a first direction substantially equal to a pitch in a second direction orthogonal to the first direction. In embodiments where the grating has a first pitch in a first direction and a second pitch in a second direction not orthogonal to the first direction, the diffraction pattern may be elongated along an axis as illustrated in FIG. 11 which shows the set of 9 diffraction peaks 1136 having the lowest 9 diffraction orders.

The intensity distribution among the diffraction peaks can be adjusted by modifying the index contrast of a grating multiplied by the peak to valley height of the grating. By selecting appropriate materials and grating geometry, a grating can be optimized to produce approximately equal intensity for the nine lowest order diffraction peaks for a given wavelength of light. In many embodiments, a green wavelength, such as 532 nm, is chosen for this optimization since green is near the center of the visible spectrum and the eye has a high photopic response to green light.

In some embodiments, the index contrast of a first one-directional grating multiplied by the peak to valley height of the first grating is selected to give an approximately equal intensity to the lowest three diffraction orders produced by the first grating alone when illuminated with a light having a first wavelength and the index contrast of a second one-directional grating multiplied by the peak to valley height of the second grating is selected to give an approximately equal intensity to the lowest three diffraction orders produced by the second grating alone when illuminated with a light having a second wavelength. In embodiments where the second wavelength is about equal to the first wavelength, an optical stack containing both the first and the second grating produces a diffraction pattern where the nine diffraction peaks having the lowest diffraction order have intensities that are approximately equal when illuminated with a light having the first or second wavelengths. In some embodiments, the first wavelength is in the wavelength range for red light (e.g., 475 nm) and the second wavelength is in the wavelength range for blue light (e.g., 650 nm). When illuminated with a light having a wavelength in the green wavelength range (e.g., 532 nm), a diffraction pattern is produced with an asymmetric intensity distribution having higher intensity in a first set of three diffraction peaks and lower intensity in each set of three diffraction peaks on either side of the first set of three diffraction peaks. Such an asymmetric intensity distribution may be useful in some cases. In some embodiments, the absolute value of the difference between the index contrast multiplied by the peak to valley height of the first grating and the index contrast multiplied by the peak to valley height of the second grating is greater than 10 nm, or greater than 20 nm and less than 100 nm.

Figure 12:
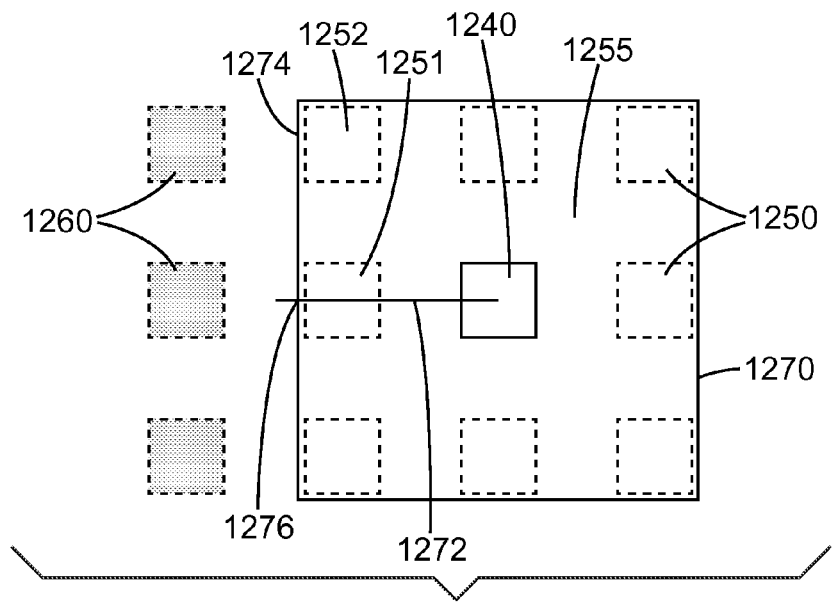
FIG. 12 is a plan view of a plurality of pixels.

FIG. 12 shows a plurality of pixels with a first pixel 1240 having a first color surrounded by primary neighbor pixels 1250 having the first color with a space 1255 between first pixel 1240 and primary neighbor pixels 1250. There may be pixels having a color other than the first color located in the space 1255. Although illustrated as square pixels on a square lattice, other geometries may be used. For example, some displays use substantially rectangular pixels. The spacing between pixels may also differ from that illustrated in FIG. 12 and may depend on the arrangement of pixels used in the display. As used herein, "primary neighbor pixels" of a first pixel 1240 having a first color refer to pixels having the first color other than the first pixel 1240 that are within or that intersect a convex region 1270, which may be defined as the set of points having the property that each point in the set of points can be reached by a line from the center of the first pixel 1240 to the point such that the line does not cross any boundary lines where boundary lines are defined as follows: A boundary line 1274 is a line that is perpendicular to a line 1272 extending from the center of first pixel 1240 through the center of a neighbor pixel 1251 having the same color as the first pixel 1240 and the boundary line 1274 intersects the point 1276 of the neighbor pixel 1251 that is most distant from first pixel 1240 on line 1272. (Point 1276 is shown slightly displaced from neighbor pixel 1251 in FIG. 12 for clarity.) A boundary line is defined for each neighbor pixel having the same color as first pixel 1240. For a periodic array of pixels, only the boundary lines of the nearest neighbor pixels contribute to defining convex region 1270. Primary neighbor pixels include nearest neighbor pixels and additional pixels that are not nearest neighbors. For example, pixel 1252 in FIG. 12 is a primary neighbor of first pixel 1240, but it is not a nearest neighbor since pixel 1251 is closer. As used herein, "secondary neighbor pixels" refer to pixels having the same color as the first pixel that are located outside of the convex region 1270. Secondary neighbors 1260 are shown in FIG. 12.

Figure 13:
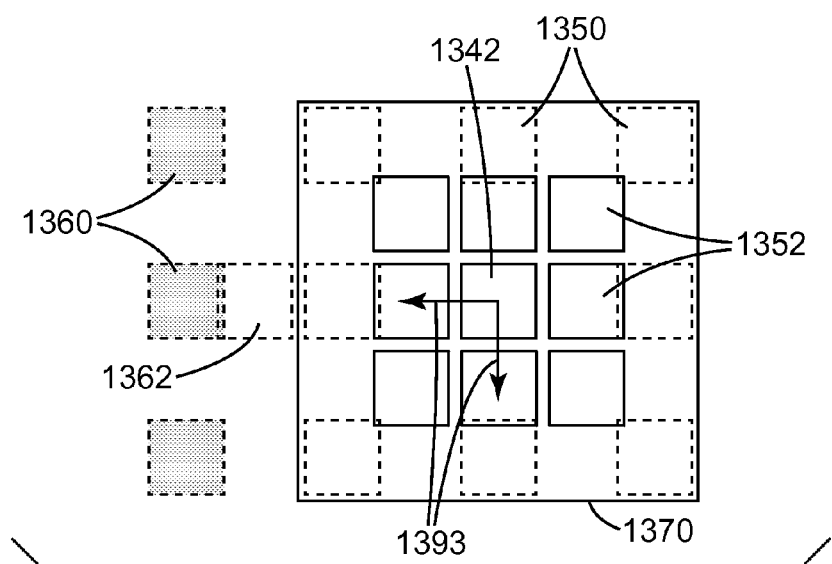
FIG. 13 a plan view of the plurality of pixels of FIG. 12 with one pixel illuminated and viewed through an optical stack.

FIG. 13 shows a plurality of pixels with a first pixel illuminated and viewed through an optical stack according to the present description. Primary neighbors 1350 of the first pixel and secondary neighbors 1360 of the first pixel are shown in FIG. 13. The illuminated first pixel produces primary image 1342 and a plurality of secondary images 1352 where each secondary image has a lateral (i.e., in the plane of FIG. 13) displacement 1393 relative to the primary image 1342. The primary image is characterized by the lowest diffraction order and is the image with the smallest displacement from the illuminated first pixel. The secondary images are defined to be those images other than the primary image having a power content at least 0.2 times the power content of the primary image. Tertiary images 1362, which are defined as images having a power content lower than 0.2 times that of the primary image, may also be produced.

In order to reduce sparkle, it is preferred that the secondary images are positioned in the space between pixels. In order to avoid degrading the resolution of the display, it is preferred that the lateral displacements 1393 of the secondary images 1352 are such that the secondary images are positioned within convex region 1370. In some embodiments, the lateral displacements 1393 of the secondary images 1352 are such that each secondary image overlaps with the plurality of primary neighbors 1350 or overlaps with a space between the first pixel and the plurality of primary neighbors 1350, and where there is substantially no overlap of the plurality of secondary images 1352 with secondary neighbor pixels 1360. It is acceptable for faint tertiary images 1362 to overlap with secondary neighbor pixels 1360 since the power content of tertiary images 1362 is low enough to not significantly degrade the perceived resolution of the display.

Figure 14:
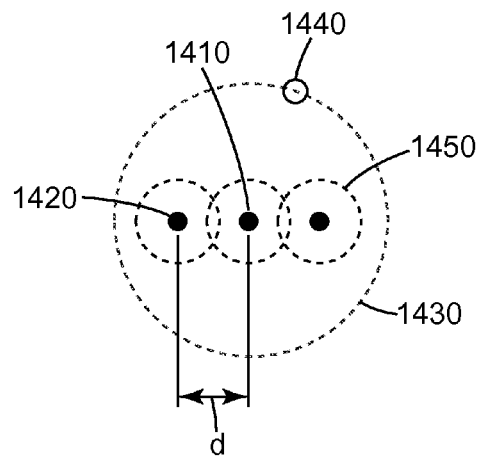
FIG. 14 shows a diffraction pattern generated by illuminating an optical stack.

In embodiments where beads are included in one or more layers of the optical stack, the effectiveness of the beads in providing a controlled diffusion of light can be tested by producing a diffraction pattern as illustrated in FIG. 9. A sketch of a portion of the resulting diffraction pattern for the case of a one-directional grating with beads is illustrated in FIG. 14. Shown in FIG. 14 are the three highest intensify diffraction peaks including central diffraction peak 1410 and nearest neighbor peak 1420. Also shown is a circle 1430 centered on central diffraction peak 1410 and having a radius of 2d where d is the spacing between the central diffraction peak 1410 and its nearest neighbor 1420. Circle 1430 includes point 1440 a distance 2d from the central diffraction peak. Around each diffraction peak, a hazy illuminated region 1450 is formed due to the presence of the beads in the optical stack. This effect may be characterized by an intensity distribution across the diffraction pattern. The intensity distribution includes an intensity $I_0$ at the central diffraction peak 1410, an intensity $I_{mid}$ at a point halfway between the central diffraction peak 1410 and the nearest neighbor diffraction peak 1420, and an intensity $I_{2d}$ at at least one point 1440 a distance 2d from the central diffraction peak.

It is desired that $I_{mid}$ be high enough that when the optical stack is used in a display that an effective pixel size is increased so that sparkle is reduced while $I_{2d}$ is low enough that there is no significant scattering of light from a first pixel to areas corresponding to secondary neighbor pixels so that the perceived resolution of the display is not significantly compromised. It has been found that even a small intensity $I_{mid}$ can provide a useful reduction in sparkle. In some embodiments, the size, refractive index and number density (i.e., number of particles per unit volume) of the particles are selected so that $I_{mid}$ is greater than about 0.001 times $I_0$ or greater than about 0.01 times $I_0$ or greater than about 0.1 times $I_0$ and $I_{2d}$ is less than about 0.001 times $I_0$ or less than about 0.0001 times $I_0$. In some embodiments, $I_{2d}$ is less than about 0.1 times $I_{mid}$ or less than about 0.01 times $I_{mid}$.

EXAMPLES

Example 1

Optical Film A was prepared according to the following procedure. A tool was fabricated using a diamond turning method that utilized a fast tool servo (FTS) as described, for example, in PCT Published Application No. WO 00/48037 (Campbell et al.), and U.S. Pat. No. 7,350,442 (Ehnes et al.) and U.S. Pat. No. 7,328,638 (Gardiner et al.). The tool was used in a cast-and-cure process as described, for example, in U.S. Pat. No. 5,175,030 (Lu et al.) and U.S. Pat. No. 5,183,597 (Lu), to produce sinusoidal structures on the primed side of a 5 mil (0.13 mm) thick PET film. An acrylate resin having a refractive index of 1.56 was used to form the sinusoidal structures. The sinusoidal structures had a peak-to-valley height of 2.6 microns and a pitch (peak-to-peak or valley-to-valley distance) of 16 microns.

Optical Film B was made as described for Optical Film A except that the pitch of the sinusoidal structures was 8 microns.

Sparkle was measured using an SMS 1000 Sparkle Measurement System (from Display-Messtechnik & Systeme. Karlsruhe, Germany). The films were cut to an appropriate screen size for each of the following devices: Google Nexus 7 2013 model (with 323 PPI), Amazon 7 inch Kindle Fire HD (with 216 PPI), and the Microsoft Surface RT (with 148 PPI). Sparkle measurements were done first with no additional film in place over the screen, then with Natural View Screen Protector only (an anti-glare film available from 3M Company, St. Paul Minn.). Results for these controls are shown in Table 1 and are designated "No film" and "NV" respectively.

Next, samples of Optical Film A were over-coated with an optically clear adhesive having a refractive index of 1.47 and were then applied to the screen of each of the three devices with the grating orientation direction at an angle of 30 degrees with respect to the horizontal direction of the display. The product of the peak to valley height of the sinusoidal structures and the absolute value of the index difference between the optically clear adhesive and the acrylate used to form the sinusoidal structures was about 234 nm. The films were applied to the devices so that the adhesive was between the screen and the sinusoidal structures. The Natural View Screen Protector film was applied as the outermost surface on top of the PET. Sparkle was again measured and is recorded as NV-W in Table 1.

Samples of Optical Film B were applied as described for Optical Film A to the three devices and the Natural View Screen Protector film was applied on top of Optical Film B. Sparkle was measured as described for Optical Film A and is recorded as NV-N in Table 1.

Another sample of Optical Film B was applied as above to the 7-inch Kindle Fire HD screen. However, in this case the optically clear adhesive contained 35% by weight of CA10 Spheromers (monosized spherical particles having 10 micron diameters and a refractive index of about 1.50, available from Microbeads AS, Skedsmokorset, Norway). The Natural View Screen Protector film was again applied on top of Optical Film B. Sparkle was measured as described above and is recorded as NV-N-B in Table 1.

Next, an optical stack consisting of two pieces of Optical Film A was assembled with the bead-free optically clear adhesive described above. The films were oriented so that the sinusoidal patterns of the two films ran perpendicular to one another with the optically clear adhesive of one layer attached to the PET of the adjacent layer. The films were attached with the same bead-free adhesive described above to the 7-inch Kindle Fire HD so that the sinusoidal structures of the film closest to the screen ran at an angle of 30 degrees with respect to the horizontal axis of the display. The Natural View Screen Protector film was again applied on the upper PET surface. Sparkle was measured as described above and is recorded as 2D-W in Table 1.

A similar stack consisting of two pieces of Optical Film B with bead-free adhesive was applied to the Google Nexus and Microsoft RT screens. The Natural View Screen Protector film was again applied on the upper PET surface. Sparkle was measured as described above and is recorded as 2D-N in Table 1.

TABLE 1

| Sample | Kindle Fire HD | Google Nexus | Microsoft RT |
|---|---|---|---|
| No film | 3.5 | 1.9 | 2.9 |
| NV | 7.9 | 9.4 | 7.1 |
| NV-W | 4.1 | 4.7 | 4.4 |
| NV-N | 2.7 | 2.8 | 3.3 |
| NV-N-B | 2.6 | | |
| 2D-W | 2.4 | | |
| 2D-N | | 2.0 | 2.8 |

Example 2

Figure 15:
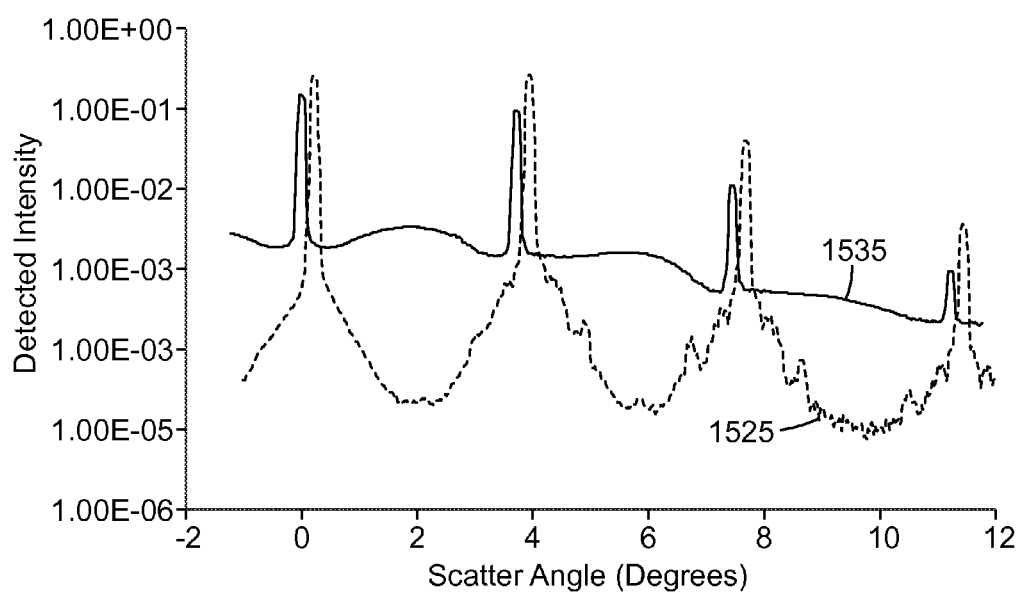
FIG. 15 shows an intensity distribution generated by illuminating an optical stack.

A sample of Optical Film B was coated with the bead-free optically clear adhesive described in Example 1 to provide a test piece, denoted sample "N", for scatterometry. A separate sample of Optical Film B was coated with the beaded optically clear adhesive described in Example 1 to provide a test piece, denoted sample "N-B", for scatterometry. Scattering profiles were measured with a scatterometer using a polarized laser operating at a wavelength of 532 nm and with a beam diameter of 1 cm. Intensities were normalized using an in-line beam with no sample in place. The in-line beam (which characterized the instrument's signature) was measured at both low and medium gain. Both samples N and N-B were measured at medium gain. The samples were oriented with the sinusoidal pattern running horizontally. FIG. 15 shows the scattering intensity as a function of scattering angle in degrees, with 0 degrees as direct forward scatter. Curve 1545 shows the intensity distribution for sample N (no beads) and curve 1535 shows the intensity distribution for sample N-B which included beads. Although not shown, the curves are expected to extend symmetrically for negative scattering angles.

Example 3

Using a Microsoft RT device, a single green pixel on the screen was illuminated using Microsoft Paint software. The optical stack consisting of two pieces of Optical Film B was prepared as in Example 1. The optical stack was attached to the screen of the device as described in Example 1, but no Natural View Screen Protector film was applied. Using an Olympus MX50 microscope with an Olympus U-TV 0.5XC-3 camera and Stream Start software (all available from Olympus America Inc., Melville N.Y.) to capture images, the screen images with and without the optical stack in place were compared. With the bare screen only the single illuminated pixel image was observed. After applying the optical stack to the screen over the illuminated pixel, nine pixel images were observed. The pixel images were arranged on an approximately square lattice rotated about 45 degrees relative to the underlying pixel arrangement. There was no overlap between the pixel images with secondary neighbor pixels.

Example 4

Intensities of the pixel images from Example 3 were measured as follows. The camera images were imported into Matlab's image processing toolbox (available from Math-Works, Natick Mass.). Using the toolbox, horizontal lines were defined across the center of each of the nine pixel images and the green intensity values along those lines were determined. An average intensity per pixel image value was computed by integrating the intensity along the line across the image and dividing by the image width. This quantity was taken to be proportional to the power content of the pixel image since the pixel images all had similar sizes. Then the sum 19 of the average intensity per pixel image for all nine of the pixel images was computed. The sum 19 is expected to be proportional to the sum of the power content of each pixel image, $P_9$. The ratio of each pixel image's average intensity per image to $I_9$ was also computed. Both the average intensity per pixel image and the ratio for the nine pixel images are reported in Table 2. (Pixel image number 5 was at the center, pixel image numbers 1 and 9, respectively, were above and below the center image, pixels image numbers 3 and 7, respectively, were right and left of the center image, pixel image number 4 was up and left of the center image, pixel image number 6 was down and right of the center image, pixel image number 2 was up and right of the center, and pixel image number 8 was down and left of the center.)

Although the data in Table 2 were collected by illuminating a single green pixel in a display, similar results would be expected if a green laser were used to illuminate the optical stack. In particular, it is expected that the ratios reported in table would correspond to the ratios of the power contents of diffraction peaks to the sum, $P_9$, of the power contents of each diffraction peak if a green laser was used to produce the diffraction pattern.

TABLE 2

| Pixel Image Number | Intensity per Pixel Image | Ratio |
|---|---|---|
| 1 | 83.51 | 0.098 |
| 2 | 93.84 | 0.111 |
| 3 | 87.48 | 0.103 |
| 4 | 93.26 | 0.110 |
| 5 | 111.71 | 0.132 |
| 6 | 98.96 | 0.117 |
| 7 | 89.11 | 0.105 |
| 8 | 98.98 | 0.117 |
| 9 | 91.35 | 0.108 |

The following is a list of exemplary embodiments of the present description.

Embodiment 1 is an optical stack, comprising a first layer and a second layer adjacent the first layer, wherein an interface between the first layer and the second layer comprises a first grating, wherein the first layer has a refractive index $n_1$, the second layer has a refractive index $n_2$, the first grating has a peak to valley height of h, $|n_1-n_2|$ multiplied by h is between about 150 nm and about 350 nm, the first grating has a first pitch in the range of about 2 microns to about 50 microns and wherein the first layer or the second layer or both the first layer and the second layer includes a plurality of particles having a size, a refractive index and a number density such that when the optical stack is illuminated with a laser light having a wavelength of about 532 nm, a diffraction pattern is produced including:

a central diffraction peak having an intensity $I_0$;
a nearest neighbor diffraction peak located a distance d from the central diffraction peak; and
an intensity distribution including:
an intensity $I_{mid}$ at a point halfway between the central diffraction peak and the nearest neighbor diffraction peak;
an intensity $I_{2d}$ at a point a distance 2d from the central diffraction peak,
wherein $I_{mid}$ is greater than about 0.01 times $I_0$ and $I_{2d}$ is less than about 0.001 times $I_0$.

Embodiment 2 is the optical stack of embodiment 1, wherein the first grating is a one-directional grating.

Embodiment 3 is the optical stack of embodiment 1, wherein the first grating is a two-directional grating.

Embodiment 4 is the optical stack of embodiment 1, wherein $I_{mid}$ is greater than about 0.1 times $I_0$.

Embodiment 5 is the optical stack of embodiment 1, wherein the first layer includes an optically clear adhesive.

Embodiment 6 is the optical stack of embodiment 1, wherein the first layer includes a polymer or a polymer composite.

Embodiment 7 is the optical stack of embodiment 1, wherein the second layer includes an optically clear adhesive.

Embodiment 8 is the optical stack of embodiment 1, wherein the second layer includes a polymer or polymer composite.

Embodiment 9 is the optical stack of embodiment 1 further comprising a third layer adjacent the second layer opposite the first layer.

Embodiment 10 is the optical stack of embodiment 9, wherein the third layer includes a polymer or a polymer composite or an optically clear adhesive.

Embodiment 11 is the optical stack of embodiment 9, wherein an interface between the second layer and the third layer comprises a second grating.

Embodiment 12 is the optical stack of embodiment 11, wherein the first grating is a first one-directional grating extending substantially along a first direction and the second grating is a second one-directional grating extending substantially along a second direction different from the first direction.

Embodiment 13 is the optical stack of embodiment 12, wherein the first direction and the second direction are substantially orthogonal.

Embodiment 14 is the optical stack of embodiment 1, wherein the plurality of particles have a mean diameter in the range of about 0.5 microns to about 30 microns.

Embodiment 15 is the optical stack of embodiment 1, wherein an absolute value of a refractive index difference between particles in the plurality of particles and a medium in which they are located is in the range of about 0.001 to about 0.1.

Embodiment 16 is the optical stack of embodiment 1, further comprising an anti-glare layer proximate the first layer opposite the second layer.

Embodiment 17 is the optical stack of embodiment 1, wherein the first layer further includes an outer major surface opposite the second layer, wherein the outer major surface includes anti-glare features.

Embodiment 18 is the optical stack of embodiment 1, wherein the optical stack is a flexible film.

Embodiment 19 is the optical stack of embodiment 1, wherein the plurality of particles are substantially monodispersed.

Embodiment 20 is a display comprising the optical stack of any of embodiments 1-19, wherein the display comprises a plurality of pixels and the optical stack is positioned proximate the plurality of pixels such that when a first pixel of the plurality of pixels having a first color is illuminated and viewed through the optical stack, a plurality of secondary images are produced, each secondary image having a lateral displacement from the first pixel, the first pixel having a plurality of primary neighbor pixels having the first color and a plurality of secondary neighbor pixels having the first color, wherein the lateral displacement of each secondary image is such that each secondary image overlaps with the plurality of primary neighbor pixels or overlaps with a space between the first pixel and the plurality of primary neighbor pixels, and wherein there is substantially no overlap of the plurality of secondary images with the secondary neighbor pixels.

Embodiment 21 is the display of embodiment 20, wherein the plurality of pixels are arranged in a pattern that repeats along a display direction and the optical stack has an orientation that includes a grating orientation direction and wherein an angle between the display direction and the grating orientation direction is in a range of about 5 degrees to about 85 degrees.

Embodiment 22 is a display comprising the optical stack of any of embodiments 1-18, wherein the display comprises a plurality of pixels and the optical stack is positioned proximate the plurality of pixels such that the grating is at a distance Z from a plane containing the plurality of pixels, the plurality of pixels have a first pitch P, the plurality of particles are substantially monodispersed and have a diameter D, wherein D is in a range of about 0.7 to about 2.5 times Z divided by P in microns.

Descriptions for elements in figures should be understood to apply equally to corresponding elements in other figures, unless indicated otherwise. The present invention should not be considered limited to the particular embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims and their equivalents.

What is claimed is:

1. An optical stack, comprising a first layer and a second layer adjacent the first layer, wherein an interface between the first layer and the second layer comprises a first grating, wherein the first layer has a refractive index $n_1$, the second layer has a refractive index $n_2$, the first grating has a peak to valley height of h, $|n_1-n_2|$ multiplied by h is between about 150 nm and about 350 nm, the first grating has a first pitch in a range of about 2 microns to about 50 microns and wherein the first layer or the second layer or both the first layer and the second layer includes a plurality of particles having a size, a refractive index and a number density such that when the optical stack is illuminated with a laser light having a wavelength of about 532 nm, a diffraction pattern is produced including:
  a central diffraction peak having an intensity $I_0$;
  a nearest neighbor diffraction peak located a distance d from the central diffraction peak; and
  an intensity distribution including:
    an intensity $I_{mid}$ at a point halfway between the central diffraction peak and the nearest neighbor diffraction peak;
    an intensity $I_{2d}$ at a point a distance 2d from the central diffraction peak, wherein $I_{mid}$ is greater than about 0.01 times $I_0$ and $I_{2d}$ is less than about 0.001 times $I_0$.

2. The optical stack of claim 1, wherein the first grating is a one-directional grating.

3. The optical stack of claim 1, wherein the first grating is a two-directional grating.

4. The optical stack of claim 1, wherein $I_{mid}$ is greater than about 0.1 times $I_0$.

5. The optical stack of claim 1, wherein the first layer includes an optically clear adhesive.

6. The optical stack of claim 1, wherein the first layer includes a polymer or a polymer composite.

7. The optical stack of claim 1, wherein the second layer includes an optically clear adhesive.

8. The optical stack of claim 1, wherein the second layer includes a polymer or polymer composite.

9. The optical stack of claim 1 further comprising a third layer adjacent the second layer opposite the first layer.

10. The optical stack of claim 9, wherein the third layer includes a polymer or a polymer composite or an optically clear adhesive.

11. The optical stack of claim 9, wherein an interface between the second layer and the third layer comprises a second grating.

12. The optical stack of claim 11, wherein the first grating is a first one-directional grating extending substantially along a first direction and the second grating is a second one-directional grating extending substantially along a second direction different from the first direction.

13. The optical stack of claim 1, wherein the plurality of particles have a mean diameter in a range of about 0.5 microns to about 30 microns.

14. The optical stack of claim 1, wherein an absolute value of a refractive index difference between particles in the plurality of particles and a medium in which they are located is in a range of about 0.001 to about 0.1.

15. The optical stack of claim 1, further comprising an anti-glare layer proximate the first layer opposite the second layer.

16. The optical stack of claim 1, wherein the first layer further includes an outer major surface opposite the second layer, wherein the outer major surface includes anti-glare features.

17. The optical stack of claim 1, wherein the plurality of particles are substantially monodispersed.

18. A display comprising the optical stack of claim 1, wherein the display comprises a plurality of pixels and the optical stack is positioned proximate the plurality of pixels such that when a first pixel of the plurality of pixels having a first color is illuminated and viewed through the optical stack, a plurality of secondary images are produced, each secondary image having a lateral displacement from the first pixel, the first pixel having a plurality of primary neighbor pixels having the first color and a plurality of secondary neighbor pixels having the first color, wherein the lateral displacement of each secondary image is such that each secondary image overlaps with the plurality of primary neighbor pixels or overlaps with a space between the first pixel and the plurality of primary neighbor pixels, and wherein there is substantially no overlap of the plurality of secondary images with the secondary neighbor pixels.

19. A display comprising the optical stack of claim 1, wherein the display comprises a plurality of pixels and the optical stack is positioned proximate the plurality of pixels such that the first grating is at a distance Z from a plane containing the plurality of pixels, the plurality of pixels have a first pitch P, the plurality of particles are substantially monodispersed and have a diameter D, wherein D is in a range of about 0.7 to about 2.5 times Z divided by P in microns.

* * * * *

UNITED STATES PATENT AND TRADEMARK OFFICE
CERTIFICATE OF CORRECTION

PATENT NO. : 9,995,944 B2  
APPLICATION NO. : 15/315947  
DATED : June 12, 2018  
INVENTOR(S) : Brett Sitter Page 1 of 1

It is certified that error appears in the above-identified patent and that said Letters Patent is hereby corrected as shown below:

In the Specification

<u>Column 4</u>  
Line 38; Delete "$|n_3 - n_2|$" and insert -- $|n_1 - n_2|$ --, therefor.

<u>Column 21</u>  
Line 27; Delete "$L_{mid}$" and insert -- $I_{mid}$ --, therefor.

Signed and Sealed this  
Twenty-sixth Day of February, 2019

Andrei Iancu  
*Director of the United States Patent and Trademark Office*